United States Patent
Le et al.

(10) Patent No.: US 7,562,020 B2
(45) Date of Patent: Jul. 14, 2009

(54) WEARABLE COMPUTER SYSTEM AND MODES OF OPERATING THE SYSTEM

(75) Inventors: Dana Le, Los Gatos, CA (US); Lucian P. Hughes, El Granada, CA (US); Owen E. Richter, Sunnyvale, CA (US)

(73) Assignee: Accenture Global Services GmbH, Schaffhausen (CH)

( * ) Notice: Subject to any disclaimer, the term of this patent is extended or adjusted under 35 U.S.C. 154(b) by 152 days.

(21) Appl. No.: 11/367,732

(22) Filed: Mar. 3, 2006

(65) Prior Publication Data

US 2006/0187628 A1  Aug. 24, 2006

Related U.S. Application Data

(63) Continuation of application No. 10/087,134, filed on Feb. 28, 2002, now Pat. No. 7,035,091.

(51) Int. Cl.
*G10L 21/00* (2006.01)
*G10L 15/00* (2006.01)

(52) U.S. Cl. ........................ 704/275; 704/257
(58) Field of Classification Search .................. 381/41, 381/43, 47, 51, 68, 68.2, 68.4, 68.6; 348/158, 348/373, 376; 345/7; 364/513; 707/3; 361/679, 361/683; 704/200, 243, 257, 270, 275
See application file for complete search history.

(56) References Cited

U.S. PATENT DOCUMENTS

| | | | | |
|---|---|---|---|---|
| 4,825,384 A | * | 4/1989 | Sakurai | 704/275 |
| 5,012,814 A | * | 5/1991 | Mills et al. | 600/510 |
| 5,371,901 A | * | 12/1994 | Reed et al. | 455/69 |
| 5,613,495 A | * | 3/1997 | Mills et al. | 600/509 |
| 5,721,783 A | * | 2/1998 | Anderson | 381/328 |
| 6,088,671 A | * | 7/2000 | Gould et al. | 704/235 |
| 6,356,437 B1 | * | 3/2002 | Mitchell et al. | 361/683 |
| 6,563,532 B1 | * | 5/2003 | Strub et al. | 348/158 |
| 6,738,775 B2 | * | 5/2004 | Asherman | 707/10 |
| 6,842,877 B2 | * | 1/2005 | Robarts et al. | 715/708 |
| 7,028,025 B2 | * | 4/2006 | Collins | 707/3 |
| 7,035,091 B2 | * | 4/2006 | Le et al. | 361/683 |
| 2002/0015008 A1 | * | 2/2002 | Kishida et al. | 345/7 |
| 2002/0062472 A1 | * | 5/2002 | Medlock et al. | 716/1 |
| 2002/0087525 A1 | * | 7/2002 | Abbott et al. | 707/3 |

* cited by examiner

*Primary Examiner*—Paresh Patel
*Assistant Examiner*—Karen M Kusumakar
(74) *Attorney, Agent, or Firm*—Fish & Richardson P.C.

(57) ABSTRACT

A wearable computer system has a user interface with at least an audio-only mode of operating, and that is natural in appearance and facilitates natural interactions with the system and the user's surroundings. The wearable computer system may retrieve information from the user's voice or surroundings using a passive user interface. The audio-only user interface for the wearable computer system may include two audio receivers and a single output device, such as a speaker, that provides audio data directly to the user. The two audio receivers may be miniature microphones that collaborate to input audio signals from the user's surroundings while also accurately inputting voice commands from the user. Additionally, the user may enter natural voice commands to the wearable computer system in a manner that blends in with the natural phrases and terminology spoken by the user.

20 Claims, 2 Drawing Sheets

WEARABLE COMPUTER SYSTEM AND MODES OF OPERATING THE SYSTEM

CROSS-REFERENCE TO RELATED APPLICATION

This application is a continuation of U.S. patent application Ser. No. 10/087,134 filed on Feb. 28, 2002, now U.S. Pat. No. 7,035,091 the contents of which are incorporated herein by reference.

TECHNICAL FIELD

The invention relates to a wearable computer system, and more particularly to contextual information storage and retrieval using a wearable computer system.

BACKGROUND

Advances in computer electronics technology have reduced the size of portable computer systems while increasing the processing speed and memory capacity. More recently, these advances have resulted in the use of a new type of portable computer system known as a wearable computer system. Wearable computer systems can be worn by a user and allow the user to operate the computer system while performing other actions, such as walking or standing. Wearable computers are also convenient to use in workspaces that do not offer enough space to use conventional computers or in workspaces that require hands-free operation of computers. More recently, GPS (global positioning system) sensors have been added to wearable computer systems, which enable the user to store location data to the wearable computer system or request current location data from the wearable computer system. For example, wearable computer systems with GPS sensors may detect the user's location, from which information the system may be able to determine whether the user is home, for example, or near a grocery store or other resource location. As such, the wearable computer system may, for example, display a notice to the user to purchase groceries when in the vicinity of the grocery store.

The "hands-free" nature of wearable computer systems offers advantages not available with other portable computer systems, such as notebook computers and PDAs (personal digital assistants). However, wearable computer systems are currently not nearly as widely used as other portable computer systems. While actual wearable computer housings are much smaller than notebook computers, user interface devices for the wearable computer systems are often considered to be obtrusive, appear unusual, and do not enable natural interaction with the wearable computer system. For example, the user interface typically includes a small video display screen worn on the user's head. These video display screens are generally visor displays or eyeglass displays, both of which are worn on the head of the user so that the screen is positioned where the user can view it.

In addition, wearable computer systems often include a microphone so that the user may enter voice commands to the computer system. While hands-free operation of wearable computer systems using voice commands is convenient, the language and syntax used to enter the voice commands may be disruptive to a conversation that the user is having with someone at the same time.

SUMMARY

The invention provides a wearable computer system that is more natural in appearance and facilitates natural interactions with the system and the user's surroundings. The invention also provides increased functionality in wearable computer systems.

In one aspect, the invention provides a wearable computer system that includes a computer unit wearable by a user and which has at least a mode of operation with an audio-only user interface. The computer unit may be worn on the belt, or in a pocket, of the user to enable hands-free operation of the wearable computer system. The audio-only user interface includes devices that allow the user to store information to the computer unit using audio signals, such as the voice of the user, and a device that allows the computer unit to output information to the user in the form of audio signals.

In one embodiment, the audio-only user interface includes an audio receiver, such as a personal microphone, that is wearable by the user and connectable to the computer unit to enable the audio receiver to receive voice signals from the user and provide the voice signals to the computer unit for processing. In addition, the audio-only user interface includes a speaker that is likewise wearable by the user and connectable to the computer unit, the speaker enabling the computer unit to send audio signals to the speaker to provide output to the user.

In another embodiment of the invention, an audio-only user interface includes a first and a second audio receiver. The first audio receiver is wearable by the user and is connectable to the computer unit to enable the first audio receiver to receive voice signals from the user and provide the voice signals to the computer unit for processing. The second audio receiver is also wearable by the user and connectable to the computer unit so as to enable the second audio receiver to input audio signals from the user's surroundings to the computer unit. In one implementation, the first audio receiver is a personal microphone that receives audio input from the user, and the second audio receiver is an environmental microphone that receives audio input from the user's surroundings. The audio signals received by the first audio receiver that do not originate with the user may be filtered with an audio filter (for example, by using a noise-canceling microphone). As such, voice signals from the user may be received without interference from environmental noise.

The wearable computer system may also include a video display but still provide the mode of operation where the interface with the user is audio-only. For example, the wearable computer unit, in one implementation, may comprise a personal digital assistant (PDA), or hand-held computer, which in the audio-only mode is kept in the user's pocket or on a belt clip. In such an implementation, the user may access information on the screen of the PDA, if, for example, hands-free operation is not needed, by taking the PDA in hand and viewing its display. In another implementation, a cellular telephone is used and worn on a belt clip or kept in the user's pocket. This cellular telephone may be integrated with the wearable computer unit (which may be a PDA, for example) to provide communications between the user and a remote user, or a remote computer.

In another aspect, the invention provides a wearable computer system that continuously stores, in a scrolling buffer, audio information, for example, audio information from the user's surroundings. Upon receiving a predetermined voice command from the user, the wearable computer system stores in memory an audio clip received in the scrolling buffer for a predetermined period of time (such as 30 seconds or one minute), so that the user may later retrieve and listen to the audio clip. In various implementations, the audio information stored for later retrieval may have been received just prior to receipt of the voice command, just after receipt of the voice command, or during a period of time occurring both before and after receipt of the voice command. In another aspect of the invention, a wearable computer system may be operated using natural voice commands to execute functions, such as storing and retrieving information. A natural voice command is a word or phrase used to execute a function of the wearable computer system that is also a standard word or phrase spoken during particular events or occurrences in daily life, for example, "nice to meet you." Thus, the user may issue a natural voice command to the wearable computer system that is less likely to disrupt a conversion the user is having with another person.

In accordance with this aspect of the invention, the wearable computer system includes an audio receiver that is adapted to be worn by a user. The audio receiver receives audio signals from the user and produces a corresponding electrical signal. The computer unit includes a processor, computer memory, and circuitry that receives and digitizes the electrical signal from the audio receiver. The computer memory has instructions that, when executed by the processor, perform a series of functions that include processing the digitized signals and recognizing spoken words therein, determining whether the recognized spoken words constitute a predetermined natural voice command, and responding to the predetermined natural voice commands from the user by prompting the processor to execute a predetermined function.

The wearable computer system may interact with the user under various modes of operation. One mode of operation is to passively record data of certain events that the user may recall at a later time. For example, the user may meet a new person and say, "nice to meet you," which is a natural voice command used to prompt the computer to record sound, location, time, and date information of this event. Another example of a natural voice command is the phrase, "What was that number again?" This phrase may initiate the storage of the voice of someone with whom the user is speaking saying the person's phone number, for example. In addition to these natural voice commands, the wearable computer system may also utilize various explicit voice commands, such as the phrase, "store that," start recording," and "end recording," as a few examples.

Another mode of operation for the computer system is location-based augmentation of the user's memory. For example, the user may be reminded to purchase items on a shopping list, which was recorded by the computer system, when the computer system senses that the user is near a location where the items may be purchased. Yet another mode of operation for the computer system is to provide real-time idea sharing. For example, the user may be wearing the computer system while answering questions at a sales presentation, and a coworker may send important sales information via a wireless network to the user's wearable computer system, which enables the user to appropriately respond to the questions.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
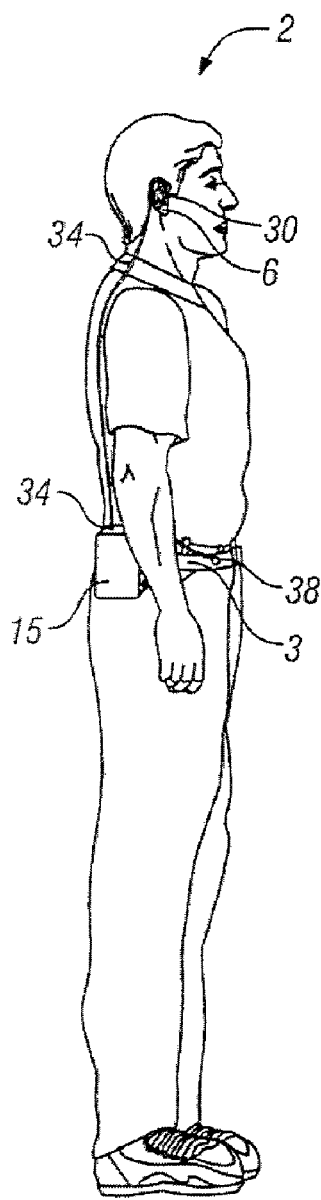
FIG. 1A is a profile view of a user wearing a computer system in accordance with an embodiment of the invention.
Figure 1B:
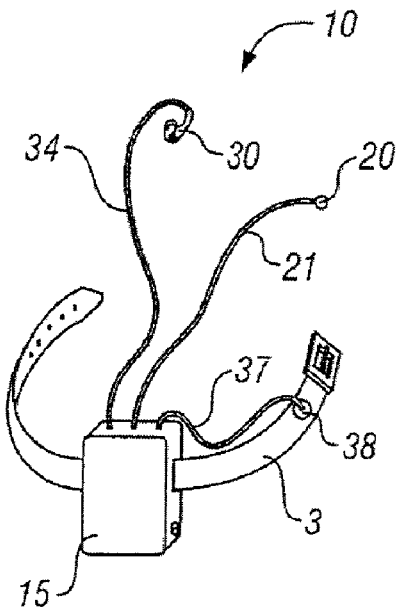
FIG. 1B is a perspective view of the wearable computer system shown in FIG. 1A.

In FIG. 1A, a user 2 is wearing a hands-free, voice-operated computer system 10 in accordance with the invention. In this embodiment, which is also shown in FIG. 1B, the wearable computer system 10 includes a computer unit 15 that may be attached to a belt 3 worn by the user 2. The wearable computer system 10 also includes an audio-only user interface, which outputs data directly to the user 2 in a form consisting of audio signals. The audio-only user interface includes an earpiece 30, which houses both a personal microphone 36 and a speaker 32, and an environmental microphone 38. The speaker 32 is housed in an earpiece 30, as shown in more detail in FIG. 1C. The personal microphone 36 may also be housed in the earpiece 30 and is used to receive audio signals from the user 2. The environmental microphone 38 may be attached to the belt 3 of the user 2, and may be used to input audio from the user's surroundings.

Before discussing the computer system 10 in more detail, we will provide an example of how the system 10 may be used. The wearable computer system 10 may be used to store information from an introduction of the user 2 to a new person. For example, the user 2 may enter a predetermined voice command to inform the wearable computer system 10 that the introduction to a new person is occurring. The predetermined voice command is received by the personal microphone 36. Receipt of the voice command may, for example, prompt the computer system 10 to record and store an audio clip surrounding the event, such as the new person speaking his or her name, using the environmental microphone 38. Other automated sensors and devices (described later) of the wearable computer system 10 may be used to store other contextual information about the user's introduction to a new person, such as location, time, and date. Later, the user 2 may recall the location, time, date, and audio data of the introduction. The information may be recalled from the wearable computer system 10, for example, if the user 2 sees the person previously met. In this case, other voice commands may prompt the replay of audible information to the speaker 32 in the earpiece 30. The information may also be uploaded to another computer system, such as a desktop computer, and recalled from there.

Figure 1C:
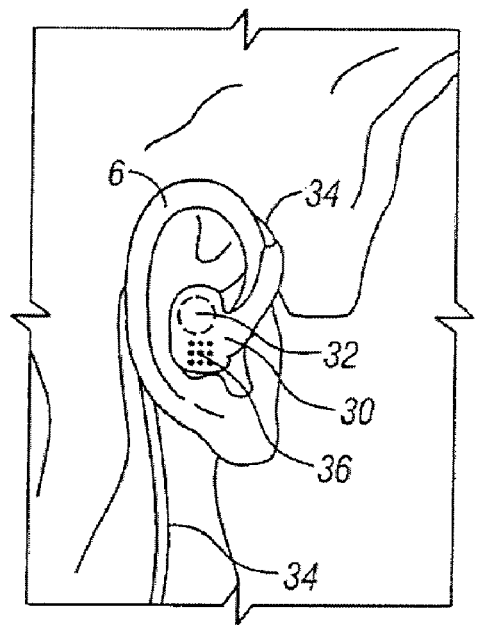
FIG. 1C is a closer view of a portion of FIG. 1A, showing the user's ear and an earpiece of the computer system.

Turning now to the details of the wearable computer system 10, the speaker 32 and personal microphone 36 in the earpiece 30 may be connected to the computer unit 15 using a thin, flexible wire 34, as shown in FIGS. 1A-1C. One example of such an integrated earpiece 30 with both an internal speaker 32 and a microphone 36 is sold by JABRA Corporation of San Diego, Calif. The wire 34 may be wrapped behind the user's ear 6, worn under the upper body clothing of the user 2, and connected to the computer unit 15 on the user's belt 3. The wire 34 being worn under the clothing helps both to prevent the wire 34 from becoming snagged on something and to conceal the wire 34 from the view of other people. In other embodiments, a boom speaker/microphone assembly may be used, or an earpiece with a bone-conduction microphone may also be used.

The personal microphone 36 may be used to input predetermined voice commands from the user 2 to the computer unit 15 using a conventional voice recognition engine (discussed later). Also, an audio filter may be associated with the personal microphone 36 to filter noise from the surroundings of the user 2 while properly receiving predetermined voice commands from the user 2. In one embodiment, the audio filter may be a combination of the position and the sensitivity setting of the personal microphone 36. In addition, or alternatively, the operation of the microphone 36 may be controlled by an algorithm that performs the noise cancellation. The microphone 36 in the FIG. 1 embodiment, for example, may operate on the principle that the microphone 36 will remain a constant distance from the user's mouth, and the algorithm calibrates the microphone operation to that distance. As such, the user 2 may input a voice command to the personal microphone 36 while in a noisy environment and the voice command from the user 2 may be properly received and input to the computer unit 15 to execute the command.

The environmental microphone 38 may also be connected to the computer unit 15 using another thin, flexible wire 37. The personal microphone 36 and the environmental microphone 38 may be used, in combination, to input audio signals to the computer unit 15. For example, as discussed above, the user 2 may input a voice command to save a person's name as the person speaks. Even if the user 2 is in a noisy environment, the audio filter associated with the personal microphone 36 filters the environmental noise and properly inputs the user's voice command. Because the audio filter may also filter the voice of the person to whom the user 2 is speaking, the environmental microphone 38, which receives audio signals that are not filtered, may be used to receive audio signals from the person. Thus, the personal microphone 36 and the environmental microphone 38 are used in collaboration to assure that voice commands are input to the computer unit 15 only from the user 2 while the audio signals from the user's surroundings may also be properly input to the computer unit 15.

The wearable computer system 10 may also include a miniature camera 20 (see FIG. 1B) that is connected to the computer unit 15 using a thin, flexible wire 21. The miniature camera 20 may be used to automatically store images of people or objects when the user 2 enters a predetermined voice command to the wearable computer system 10. The miniature camera 20 may be worn on the shirt of the user 2 with the wire 21 worn underneath the upper body clothing of the user 2. For example, a button on the user's shirt may be replaced with the miniature camera 20 so that the camera has a natural appearance.

As shown in FIG. 1A, the computer unit 15 may be worn on the belt 3 of the user 2 so that the computer unit 15 is minimally obtrusive. By way of example, the size of the computer unit 15 may have a width that is no greater than 5.0 inches, a length that is no greater than 4.0 inches, and a depth that is no greater than 1.5 inches. In addition, computer units 15 with smaller sizes and varying shapes to provide a computer unit 15 that is less obtrusive are within the scope of the invention. It is contemplated that the size of the computer unit 15 may become smaller as computer technology advances, or the size may remain constant but may provide more capability.

Figure 2:
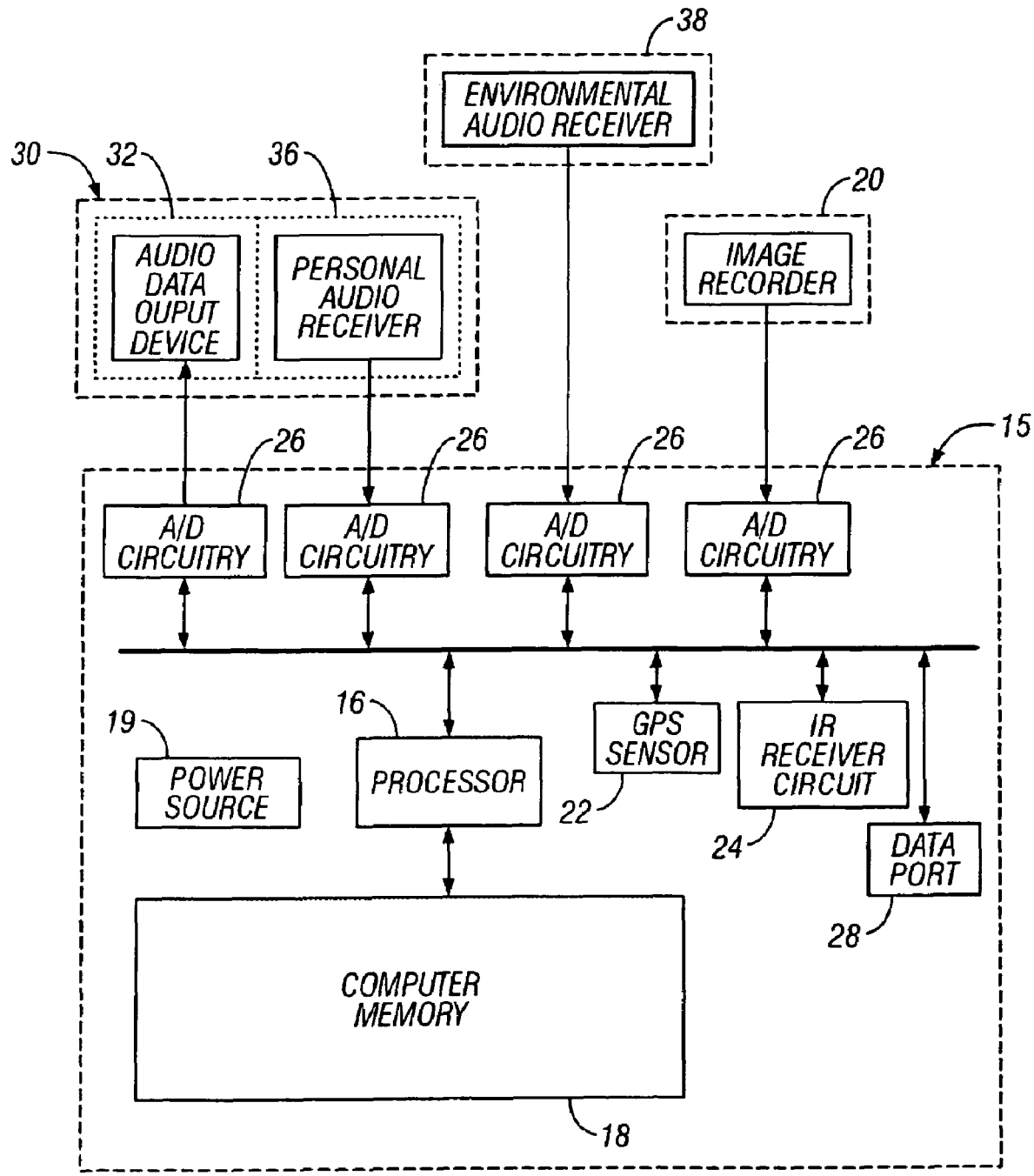
FIG. 2 is a block diagram of an embodiment of the wearable computer system shown in FIG. 1A.

A block diagram of the wearable computer system 10 from FIGS. 1A-C is shown in FIG. 2. A processor 16 is connected to computer memory 18 inside the computer unit 15. A power source 19, such as a battery, may be housed within the computer unit 15 for supplying power to all the circuitry in the system 10. An audio output device 32 and a personal audio receiver 36, such as the speaker 32 and personal microphone 36, respectively, are housed in the earpiece 30. The personal microphone 36 receives audio signals from the user 2 and sends electrical signals, such as analog signals, to the computer unit 15. The computer unit 15 includes conventional analog-digital circuitry 26 that digitizes the analog signal from the personal microphone 36. The computer memory 18 includes a voice recognition engine that receives the digitized signals from the analog-digital circuitry 26 and interprets the proper commands to be executed by the processor 16. In addition, an environmental audio receiver 38 and an image recorder 20 are connected to the computer unit 15, such as the environmental microphone 38 and miniature camera 20 shown in FIGS. 1A-B. Similar analog-digital circuitry 26 may be connected to the speaker 32, the environmental microphone 38, and the miniature camera 20.

The computer unit 15 may include a continuously scrolling audio buffer to store audio information received by the environmental microphone 38, for example. This buffer (which is a part of memory 18 in one implementation) continuously records ambient audio, and saves it for some predetermined period of time, such as 30 seconds or one minute. In other words, this continuously scrolling buffer may discard recorded audio information after 30 seconds if the user 2 has not issued a predetermined command to store the information for later retrieval. This allows the user 2 to store audio clips just before, or after, the user 2 issues a predetermined voice command, as will be described in more detail later.

While the data input directly from the user 2 to the wearable computer system 10 consists of audio data, the wearable computer system 10 may automatically input data from other sources that do not employ a user interface. A conventional GPS sensor 22 to input the location of the user 2 may be enclosed inside the computer unit 15 of the wearable computer system 10 and connected to the processor 16. Another source of data for the wearable computer system 10 may be a conventional IR (infra red) receiver circuit 24 for inputting data, such as positional information within a building, from an IR beacon.

A data port 28 is used to upload saved data from the computer unit 15 directly to a remote computer (not shown) or to download information, such as software updates, from the remote computer to the computer unit 15. The data port 28 may use a conventional connection to the remote computer, such as a USB or IR port, or a wireless network connection. In one embodiment, the data port 28 of the computer unit 15 may be connected to a wireless radio frequency (RF) transmitter (for example, a cellular telephone), for transmissions to or from another person or remote computer. The data port 28, the miniature camera 20, the GPS sensor 22, and the IR receiver circuit 24 are all examples of sources that may be used by the wearable computer system 10 to input information without employing a user interface, and thus enabling the wearable computer system 10 to be less noticeable on the user 2.

The user interface devices of the wearable computer system 10, such as the earpiece 30 and the environmental microphone 38, blend in with the natural appearance of the user 2. The wearable computer system 10 is also minimally obtrusive to the movements and actions of the user 2. The audio-only user interface of the wearable computer system 10 does not require the use of noticeable visual displays, such as a visor display or an eyeglass display. Visual displays for wearable computers have often been worn on the user's head with a small display screen projecting in front of the user's eye. Even the smallest of these displays are difficult to conceal and do not blend in with the natural appearance of the user 2. Also, such displays are distracting and disruptive to conversation and interaction with other people.

Nevertheless, in one embodiment a personal digital assistant (PDA), or hand-held computer, may be integrated with the computer unit 15, or serve as the computer unit 15. As such, the PDA provides a display for the user 2 when hands-free operation is not needed. Even in this embodiment, although a video user display is available, the wearable computer system 10 avoids the use of the head-mounted video displays used in the prior art.

Additional measures may be taken to make the wearable computer system 10 even more unintrusive for the user 2 and people who interact with the user 2. For example, FIGS. 1A-1B show the computer unit 15 attached to the belt 3 on the user 2, but the computer unit 15 may alternatively be carried in a pocket of the user's clothing, depending on the size of the computer unit 15. Also, the earpiece 30 may be made of a transparent or translucent material, or the color of the earpiece 30 may be similar to the skin color of the user 2 to further blend in with the natural appearance of the user 2. In addition, having an earpiece in one's ear is becoming a normal appearance. Indeed, with cellular telephones, for example, earpieces are commonly used to converse on the telephone in a hands-free manner.

In another aspect of the invention, the wearable computer system 10 uses natural voice commands from the user 2. Natural voice commands enable the user 2 to input voice commands to the wearable computer system 10 in a manner that blends with the natural phrases and terminology spoken by the user 2. A natural voice command is a word or phrase used to execute a function of the wearable computer system 10 that is also a standard word or phrase spoken during particular events or occurrences in daily life. As such, the issuance of a voice command by the user 2 may be done in a way that does not disrupt the conversion. For example, the phrase, "Nice to meet you," is a standard statement that is commonly spoken during an introduction between two people. This standard phrase may be used as a natural voice command to execute a function, or series of functions, by the wearable computer system 10 based on the event of meeting a new person.

Other examples of standard phrases used to derive the context of the user's actions that may be used as natural voice commands include: "How are you doing?" "What is your name?" "Remember to buy," and "www." For example, the user 2 may say "How are you doing?" to another person, which prompts the wearable computer system 10 to store a brief audio recording of the conversation, the time and date of the conversation, the user's location, and an image of the person speaking with the user 2. A similar set of functions may be performed by the wearable computer system 10 if the user 2 asks "What is your name?" to another person. In another example, the user 2 may speak the phrase, "I need to remember to buy," during a conversation with another person about a particular product, or when the user 2 is alone. The "remember to buy" portion of that phrase may prompt the wearable computer system 10 to record an audio sound byte of the conversation and the time and date of the conversation. Similarly, the user 2 may read aloud an internet website address that is printed on a sign, so the phrase, "www," may be used to prompt the computer system 10 to record an audio sound byte of the user 2 speaking the complete website address. Many other natural voice commands may be used by the wearable computer system 10 depending on the location and preferences of the user 2.

The previously discussed mode of operation for an introduction of the user 2 to a new person may now be explained in more detail. The user 2 may be introduced to a new person, and greet the new person by speaking the phrase, "Nice to meet you." This phrase may be set up by the user 2, or during manufacture, to be one of the natural voice commands programmed in the wearable computer system 10 that is recognized by the voice recognition engine. The "Nice to meet you" phrase can be easily picked up by the personal microphone 36 and passively input to the computer unit 15 as a command to execute a series of functions to occur based on the context of meeting the new person.

The wearable computer system 10 may then be prompted to use the miniature camera 20 to save an image of the new person that the user 2 is presumably meeting, and a thirty-second sound byte surrounding the event is input from the environmental microphone 38 and saved into the computer memory 18. The previously described audio buffer may be employed to store a clip audio data before the natural voice command is spoken, so the sound clip may include some audio data of the words spoken before the natural voice command was actually spoken. For example, if someone with whom the user 2 is speaking says "my name is John Doe," and the user 2 responds. "I am Jane Doe; it is nice to meet you," then the audio buffer allows the capture of audio information just before the voice command was issued. In other contexts, it may be desirable to record audio information that occurs after the voice command is issued, or a combination of audio information received before and after the voice command is issued. In addition, the system may allow the-user the user 2 to issue an explicit voice command such as "start recording," which would start the storage of received audio information for later retrieval, and issue a later explicit voice command such as "stop recording," to stop the storage of audio information for later retrieval. In this case, the audio information received between the two commands would be stored and available for later retrieval.

The predetermined voice commands, whether natural or explicit, may be customized by the user 2 through a set-up procedure. For example, one user may select the phrase, "Nice to meet you," to initiate the storage of an audio clip, while another user may select the phrase, "How do you do?" In one implementation, the set-up procedure may be implemented by the user 2 being prompted by the audio receiver 36 to speak a phrase that will serve as the predetermined voice command for a specific function type, such as meeting a new person and recording that person's name. In response, the user 2 will provide the desired phrase, which will be stored so that later when that phrase is spoken by the user 2, the storage may occur. In addition, during this set-up procedure, the user 2 may be prompted for additional information, such as the timing of the voice clip in relation to the issuance of the voice command the voice clip will be taken (for example, before the voice command, after the voice command, or a combination of both before and after the voice command). Also, the set up procedure may allow the user 2 to select the period of time for the voice clip, for example, 10 seconds, 20 seconds, one minute, etc. As such, it is possible to adjust the system so that when the audio information is later retrieved, it does not take too long to obtain the information needed. For example, if only the name of a person previously met is needed, it may not be desirable for the user 2 to have to review a one minute clip of previously stored audio information. As an alternative to the set up procedure being done on the wearable computer system 10 itself, the setup may be done using another computer, and downloaded to the wearable computer 10.

Location information from the GPS sensor 22 may be referenced against a database of locations stored in the computer memory 18, and labeled as "work," "home," or "store," that may be set up by the user 2. A conventional computer clock and calendar of the computer unit 15 may be used to record the time and date of the introduction of the new person. Thus, contextual information from the introduction, which may also be stored, may include location, time and date information, audio of the new person speaking his or her name, and an image of the person. This contextual information may also be uploaded to a different computer, such as a desktop computer, from the computer unit 15 using the data port 28 at a later time. Additionally, the user 2 may recall the location, time, date, and audio data of the introduction to be output to the user's ear 6 using the speaker 32 in the earpiece 30 for reference when the user 2 and the new person meet again.

Another mode of operation for the wearable computer system 10 may be location-based augmentation of the user's memory. For example, the user 2 may have a conversation with another person about a particular product at a retail store. During the conversation, the user 2 may speak the phrase, "I should remember to buy," the product. Although this phrase may be a naturally spoken phrase in a conversation about a retail product, the words "remember to buy" may be set up to be a natural voice command. The natural voice command is input to the computer unit 15, and a sound byte of the conversation surrounding the words "remember to buy" is stored in the computer memory 18 using the environmental microphone 38. Later, the user 2 may arrive at a store, and the GPS sensor 22 is used to automatically reference the location of the user 2 against the database of locations saved in the computer memory 18. The location of the user 2 is referenced as a retail store, so the wearable computer system 10 outputs the audio data surrounding the "remember to buy" voice command using the speaker 32 in the earpiece 30. Thus, the user 2 may be reminded to complete a task by simply arriving at a particular location.

A further mode of operation for the wearable computer system 10 is to provide the user with real-time idea sharing. For example, the user 2 may be conducting a sales presentation in front of an audience, and the user 2 may have to respond to a question during the presentation. A co-worker of the user 2 attending the meeting may type the proper answer to the question on a laptop computer and send a message through a wireless network connection to the wearable computer system 10 of the user 2. The information from the co-worker is received by the computer system 10 using the wireless network connection in the data port 28. The information is then converted text-to-speech (TTS) and output to the user's ear 6 via the speaker 32 in the earpiece 30, and the user 2 may respond to the question in a prompt and appropriate manner. In another implementation, the remote co-worker may provide an audio message by speaking into a cellular telephone, which may be received by the computer unit 15 at data port 28 and forwarded to the user. As such, the communication may be TTS or the forwarding of speech.

A number of embodiments of the invention have been described. Nevertheless, it will be understood that various modifications may be made without departing from the spirit and scope of the invention. For example, the personal microphone 36 and the miniature speaker 32 in the earpiece 30 may be connected to the computer unit 15 using a conventional wireless connection instead of the flexible wire 34. Similarly, the environmental microphone 38 and the miniature camera 20 may be connected to the computer unit 15 using a conventional wireless connection instead of the flexible wires 37 and 21. Another embodiment of the invention may include using the housing of a cellular phone to enclose the computer unit 15. Thus, the earpiece 30 and the environmental microphone 28 would be worn by the user 2 and would be connected to the computer unit 15 within the cellular phone housing. In a further embodiment of the invention, the data port 28 may use a conventional wireless connection to upload and download information between a remote computer and the computer unit 15. Further yet, another implementation uses a cellular telephone and a PDA working in tandem, or a wireless PDA. The computer unit 15 capability may reside, for example, in the PDA, with the data port 28 providing a connection to a cellular telephone for communication to another person or a remote computer. Accordingly, other embodiments are within the scope of the following claims.

What is claimed is:

1. A method implemented by a wearable computer device, comprising:

continuously recording a conversation in a scrolling memory buffer that stores audio data for a predetermined period of time, and that discards the audio data after the predetermined period of time has expired if a user has not issued a voice command to move the audio data to a separate memory for output at a later time;

accessing voice commands stored in the separate memory, the voice commands for storing audio data surrounding a receipt of a respective voice command in the separate memory, each voice command being customized by the user to blend with natural conversational phrasing and terminology without disrupting the conversation, and each voice command specifying:

an amount of audio data stored in the scrolling memory buffer before receipt of the respective voice command to move into the separate memory upon receipt of the respective voice command, the amount of audio data to move being less than all of the audio data stored in the scrolling memory buffer, and an amount of audio data to record in the separate memory after receipt of the respective voice commands;

recognizing, using a processor, phrases spoken by the user during the conversation;

determining, using the processor, that a recognized phrase spoken by the user during the conversation matches an accessed voice command;

moving the amount of audio data specified by the accessed voice command from the scrolling memory to the separate memory, and recording the amount of audio data specified by the accessed voice command in the separate memory, based on determining that the recognized phrase spoken by the user during the conversation matches the accessed voice command; and at the later time, outputting the audio data surrounding the receipt of the accessed voice command, using an earpiece of the wearable computer device.

2. The method of claim 1, further comprising:

storing a current location, current time and current date in the separate memory when determining that the recognized phrase spoken by the user during the conversation matches the accessed voice command.

3. The method of claim 2, further comprising determining the current location using an infrared (IR) beacon.

4. The method of claim 1, further comprising uploading the audio data surrounding the receipt of the accessed voice command to a remote computing device for later output.

5. The method of claim 1, further comprising:

capturing a camera image, using a camera of the wearable computer device, when determining that the recognized phrase spoken by the user during the conversation matches the accessed voice command.

6. The method of claim 1, further comprising, during a voice command set-up procedure:

prompting the user to specify, via spoken input:
   a phrase that will serve as a new voice command,
      the amount of audio data stored in the scrolling memory buffer before receipt of the new voice command to move into the separate memory upon receipt of the new voice command, and
      the amount of audio data to record in the separate memory after receipt of the new voice command; and
   recognizing the spoken input of the user in response to the prompting; and
   adding the new voice command to the voice commands.

7. The method of claim 1, wherein the audio data surrounding the receipt of the accessed voice command is automatically output based on determining that the user has arrived at a specified location.

8. A wearable computer device, comprising:
   a scrolling memory buffer configured to continuously record a conversation, the scrolling memory buffer storing audio data for a predetermined period of time, and discarding the audio data after the predetermined period of time has expired if a user has not issued a voice command to move the audio data to a separate memory for output at a later time;
   a separate memory storing voice commands, the voice commands for storing audio data surrounding a receipt of a respective voice command in the separate memory, each voice command being customized by the user to blend with natural conversational phrasing and terminology without disrupting the conversation, and each voice command specifying:
      an amount of audio data stored in the scrolling memory buffer before receipt of the respective voice command to move into the separate memory upon receipt of the respective voice command, the amount of audio data to move being less than all of the audio data stored in the scrolling memory buffer, and
      an amount of audio data to record in the separate memory after receipt of the respective voice commands,
   a processor configured to:
      recognize phrases spoken by the user during the conversation,
      determine that a recognized phrase spoken by the user during the conversation matches a voice command, and
      move the amount of audio data specified by the voice command from the scrolling memory to the separate memory, and record the amount of audio data specified by the voice command in the separate memory, based on determining that the recognized phrase spoken by the user during the conversation matches the voice command; and
   an earpiece configured to, at the later time, output the audio data surrounding the receipt of the voice command.

9. The device of claim 8, wherein the separate memory is further configured to store a current location, current time and current date in the separate memory when determining that the recognized phrase spoken by the user during the conversation matches the accessed voice command.

10. The device of claim 9, further comprising an location determination module configured to determine the current location using an infrared (IR) beacon.

11. The device of claim 8, further comprising an interface configured to upload the audio data surrounding the receipt of the accessed voice command to a remote computing device for later output.

12. The device of claim 8, further comprising a camera configured to capture a camera image when determining that the recognized phrase spoken by the user during the conversation matches the accessed voice command.

13. The device of claim 8, further comprising a voice recognition engine configured to, during a voice command set-up procedure:
   prompt the user to specify, via spoken input:
      a phrase that will serve as a new voice command,
      the amount of audio data stored in the scrolling memory buffer before receipt of the new voice command to move into the separate memory upon receipt of the new voice command, and
      the amount of audio data to record in the separate memory after receipt of the new voice command; and
   recognize the spoken input of the user in response to the prompting; and
   add the new voice command to the voice commands.

14. The device of claim 8, wherein the audio data surrounding the receipt of the accessed voice command is automatically output based on determining that the user has arrived at a specified location.

15. A computer-readable medium encoded with a computer program comprising instructions that, when executed, operate to cause a computer to perform operations comprising:
   continuously recording a conversation in a scrolling memory buffer that stores audio data for a predetermined period of time, and that discards the audio data after the predetermined period of time has expired if a user has not issued a voice command to move the audio data to a separate memory for output at a later time;
   accessing voice commands stored in the separate memory, the voice commands for storing audio data surrounding a receipt of a respective voice command in the separate memory, each voice command being customized by the user to blend with natural conversational phrasing and terminology without disrupting the conversation, and each voice command specifying:
      an amount of audio data stored in the scrolling memory buffer before receipt of the respective voice command to move into the separate memory upon receipt of the respective voice command, the amount of audio data to move being less than all of the audio data stored in the scrolling memory buffer, and
      an amount of audio data to record in the separate memory after receipt of the respective voice commands;
   recognizing, using a processor, phrases spoken by the user during the conversation;
   determining, using the processor, that a recognized phrase spoken by the user during the conversation matches an accessed voice command;
   moving the amount of audio data specified by the accessed voice command from the scrolling memory to the separate memory, and recording the amount of audio data specified by the accessed voice command in the separate memory, based on determining that the recognized phrase spoken by the user during the conversation matches the accessed voice command; and
   at the later time, outputting the audio data surrounding the receipt of the accessed voice command, using an earpiece of the wearable computer device.

16. The computer-readable medium of claim 15, wherein the operations further comprise:
   storing a current location, current time and current date in the separate memory when determining that the recognized phrase spoken by the user during the conversation matches the accessed voice command.

17. The computer-readable medium of claim 16, wherein the operations further comprise determining the current location using an infrared (IR) beacon.

18. The computer-readable medium of claim 15, wherein the operations further comprise uploading the audio data surrounding the receipt of the accessed voice command to a remote computing device for later output.

19. The computer-readable medium of claim 15, wherein the operations further comprise:
    capturing a camera image, using a camera of the wearable computer device, when determining that the recognized phrase spoken by the user during the conversation matches the accessed voice command.

20. The computer-readable medium of claim 15, wherein the operations further comprise, during a voice command set-up procedure:
    prompting the user to specify, via spoken input:
        a phrase that will serve as a new voice command,
        the amount of audio data stored in the scrolling memory buffer before receipt of the new voice command to move into the separate memory upon receipt of the new voice command, and
        the amount of audio data to record in the separate memory after receipt of the new voice command; and
    recognizing the spoken input of the user in response to the prompting; and
    adding the new voice command to the voice commands.

* * * * *

UNITED STATES PATENT AND TRADEMARK OFFICE
CERTIFICATE OF CORRECTION

PATENT NO. : 7,562,020 B2  Page 1 of 1
APPLICATION NO. : 11/367732
DATED : July 14, 2009
INVENTOR(S) : Dana Le It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 186 days.

Signed and Sealed this

Second Day of November, 2010

David J. Kappos
*Director of the United States Patent and Trademark Office*